Sept. 29, 1942.  F. WILEN  2,297,599
EFFERVESCENT TABLET
Filed Sept. 28, 1940
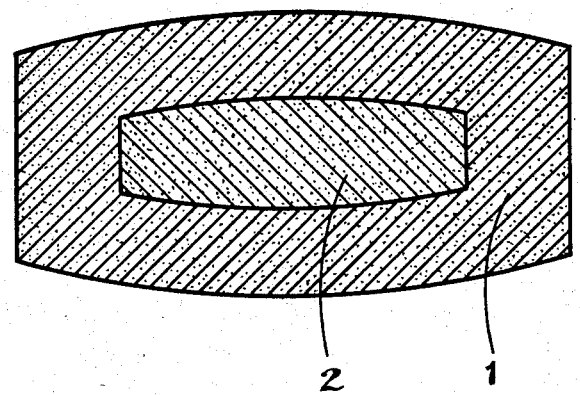
Frank Wilen
INVENTOR Patented Sept. 29, 1942

2,297,599

UNITED STATES PATENT OFFICE 2,297,599

EFFERVESCENT TABLET

Frank Wilen, Brooklyn, N. Y., assignor to E. R. Squibb & Sons, New York, N. Y., a corporation of New York Application September 28, 1940, Serial No. 358,849

5 Claims. (Cl. 167—57)

This invention relates to therapeutic or alimentary tablets of the effervescent type; i. e., tablets which embody, in addition to an active substance (which term, as employed herein, embraces therapeutic and alimentary substances), an effervescent base (a mixture of compounds giving rise to effervescence on contact with water). The effervescence serves, inter alia, to: (a) give the preparation a more acceptable appearance and/or taste; (b) divert the attention of the consumer from the (unpleasant) taste of the active substance; and (c) hasten the solution, or maintain the suspension, of the active substance.

Hitherto it has been the practice to mix the effervescent base more or less homogeneously with the active substance, so that, as the tablet disintegrates in the water, the interaction of the effervescence-producing ingredients and the liberation of the active substance proceed at the same rate; with the result that when the last portion of the active substance is freed and the preparation is therefore ready for consumption, the effervescence has practically ceased. Accordingly, the consumer must drink the preparation either while the active substance has not been entirely liberated (but effervescence is fairly strong), or else when the effervescence has become weak or has ended (but liberation of the active substance has been substantially completed).

It is the object of this invention to provide tablets of the effervescent type that effervesce vigorously for an appreciable time after complete liberation of the active substance.

The tablets of this invention are formed of an active substance—which may or may not be in admixture with an effervescent base—and embody a core of effervescent base alone (i. e., containing substantially none of the active substance). With tablets so constructed, effervescence not only may proceed concurrently with, but also survives for the desired period, liberation of the active substance, so that all of the active substance in the tablet may be consumed while the preparation is still effervescing. Advantageously, a coloriferous substance may be included in or placed around the core; exposure of a colored core, or coloration of the preparation—depending on the solubility of the coloriferous substance—then signalizing that the preparation is ready for consumption.

Tablets constituted in accordance with this invention may be produced suitably by positioning a preformed (compressed) unit of effervescent base alone within a single-tablet quantity of the active substance—which may or may not be in admixture with an effervescent base—and compressing the so-arranged materials into a tablet; alternatively, the tablet may be produced by depositing a layer of the active-substance granulation in a suitable tablet die, then depositing a granulation of the core-ingredients (effervescent base) on top of the layer—either in a centrally-located heap or in a suitably-formed depression therein—then depositing thereover another layer of the active-substance granulation, and finally compressing the so-arranged materials into a tablet. By suitable modification of the conventional tablet-making machines—especially machines adapted for making compound (layer) tablets—to perform these operations, the tablets of this invention may be efficiently and inexpensively produced.

In the drawing, the figure reprecents an axial sectional view of a tablet embodying the invention, the tablet illustrated being of the comparatively large, wafer type commonly used for the administration of alkalinizing medicinals. The tablet proper 1 consists of a compressed granulation of active substance in admixture with effervescent base, and the core 2 comprises a compressed granulation of effervescent base alone. Manifestly the tablet proper and core may vary widely in size and shape; but preferably the core should be so shaped and positioned that it will be exposed on all sides, by disintegration of the active-substance granulation, at about the same time.

To provide a more vigorous and/or more general effervescence, the core may comprise a plurality of separate units of effervescent base alone, preferably embedded in a highly-soluble, solid diluent; when such core is exposed it disintegrates and forms a plurality of effervescence-producing nuclei, with resulant vigorous, general effervescence. This change in the degree or location of effervescence also serves to signalize readiness of the preparation for consumption.

The invention is applicable generally to therapeutic or alimentary tablets of the effervescent type, especially the former. With alimentary tablets, e. g., tablets for preparing a fruit-flavored, carbonated beverage, the persistence of effervescence (carbonation) after readiness of the beverage for consumption is obviously highly desirable.

The following examples are illustrative of the invention:

EXAMPLE 1

"Effervescent triple bromide tablets"

The following ingredients are intermingled in the relative proportions specified:

Sodium bromide _____ 2
Potassium bromide _____ 2
Ammonium bromide _____ 2
Effervescent base—
    Monosodium dihydrogen citrate _____ 8.3
    Sodium bicarbonate _____ 4.4

The mixture is formed into tablets embodying a core of the same or another effervescent base alone (each tablet containing 6 grains sodium bromide, 6 grains potassium bromide and 3 grains ammonium bromide).

EXAMPLE 2

"Effervescent alkalizing tablets"

The following ingredients are intermingled in the relative proportions specified:

| | |
|---|---|
| Calcium gluconate | 1 |
| Sodium bicarbonate | 5 |
| Potassium bicarbonate | 1 |
| Magnesium sulfate (dried) | 1 |
| Sodium chloride | 1 |
| Effervescent base (e. g., sodium bicarbonate, citric acid, and tartaric acid) | Q. S. |

The mixture is formed into tablets embodying a core of effervescent base alone (each tablet containing 1 grain calcium gluconate and proportionate quantities of the other ingredients).

EXAMPLE 3

"Effervescent lemonade tablets"

The following ingredients are intermingled in the amounts specified:

| | | |
|---|---|---|
| Icing sugar | pounds | 1 |
| Oil of lemon | drops | 20 |
| Effervescent base— | | |
| Sodium bicarbonate | ounces | 2 |
| Tartaric acid | do | 2 |

The mixture is formed into tablets embodying a core of effervescent base alone (each tablet containing a sufficient quantity to produce a glassful of effervescent lemonade).

The invention may be variously otherwise embodied, within the scope of the appended claims.

I claim:

1. A compound therapeutic or alimentary tablet constituted of a core essentially comprising an effervescent base and containing substantially none of the desired therapeutic or alimentary substance, and a surrounding layer of a water-disintegrable composition essentially comprising a member of the group consisting of therapeutic and alimentary substances.

2. A compound therapeutic or alimentary tablet constituted of a core essentially comprising an effervescent base and containing substantially none of the desired therapeutic or alimentary substance, and a surrounding layer of a composition essentially comprising a mixture of an effervescent base and a member of the group consisting of therapeutic and alimentary substances.

3. A compound therapeutic or alimentary tablet constituted of a core consisting of an effervescent base associated with a coloriferous substance, and a surrounding layer of a water-disintegrable composition essentially comprising a member of the group consisting of therapeutic and alimentary substances.

4. A compound therapeutic or alimentary tablet constituted of a core consisting of a plurality of separate units of effervescent base embedded in a highly-soluble solid diluent, and a surrounding layer of a water-disintegrable composition essentially comprising a member of the group consisting of therapeutic and alimentary substances.

5. A compound therapeutic or alimentary tablet constituted of a core essentially comprising an effervescent base, and a surrounding layer of a water-disintegrable composition essentially comprising a member of the group consisting of therapeutic and alimentary substances and containing substantially no effervescent base.

FRANK WILEN.

CERTIFICATE OF CORRECTION.

Patent No. 2,297,599.  September 29, 1942.

FRANK WILEN.

It is hereby certified that error appears in the printed specification of the above numbered patent requiring correction as follows: Page 2, first column, line 4, Example 1, for "and 3" read --and 6--; and that the said Letters Patent should be read with this correction therein that the same may conform to the record of the case in the Patent Office.

Signed and sealed this 31st day of October, A. D. 1944.

Leslie Frazer (Seal)  Acting Commissioner of Patents.